(12) United States Patent
Ravishankar et al.

(10) Patent No.: US 7,401,360 B2
(45) Date of Patent: Jul. 15, 2008

(54) METHODS AND SYSTEMS FOR IDENTIFYING AND MITIGATING TELECOMMUNICATIONS NETWORK SECURITY THREATS

(75) Inventors: Venkataramaiah Ravishankar, Apex, NC (US); Apirux Bantukul, Cary, NC (US); Virgil E. Long, Raleigh, NC (US)

(73) Assignee: Tekelec, Morrisville, NC (US)

( * ) Notice: Subject to any disclaimer, the term of this patent is extended or adjusted under 35 U.S.C. 154(b) by 836 days.

(21) Appl. No.: 10/308,316

(22) Filed: Dec. 3, 2002

(65) Prior Publication Data
US 2004/0107362 A1 Jun. 3, 2004

(51) Int. Cl.
G06F 21/00 (2006.01)
G06F 15/16 (2006.01)
(52) U.S. Cl. .................................. 726/22; 709/232
(58) Field of Classification Search .................. 726/2, 726/11, 14
See application file for complete search history.

(56) References Cited

U.S. PATENT DOCUMENTS

| | | | |
|---|---|---|---|
| 5,701,301 A | 12/1997 | Weisser, Jr. | |
| 5,862,334 A | 1/1999 | Schwartz et al. | |
| 6,167,129 A | 12/2000 | Fikis et al. | |
| 6,308,276 B1* | 10/2001 | Ashdown et al. | 726/11 |
| 6,347,374 B1* | 2/2002 | Drake et al. | 726/1 |
| 6,498,843 B1 | 12/2002 | Cox | |
| 6,789,203 B1* | 9/2004 | Belissent | 726/22 |
| 7,043,000 B2 | 5/2006 | Delaney et al. | |
| 7,237,267 B2* | 6/2007 | Rayes et al. | 726/25 |
| 7,246,376 B2* | 7/2007 | Moharram | 726/23 |
| 2002/0133586 A1* | 9/2002 | Shanklin et al. | 709/224 |
| 2003/0135759 A1* | 7/2003 | Kim et al. | 713/201 |
| 2003/0177389 A1* | 9/2003 | Albert et al. | 713/201 |
| 2003/0221123 A1* | 11/2003 | Beavers | 713/201 |
| 2004/0093512 A1* | 5/2004 | Sample | 713/201 |
| 2004/0093513 A1* | 5/2004 | Cantrell et al. | 713/201 |
| 2004/0111643 A1* | 6/2004 | Farmer | 713/201 |
| 2006/0095970 A1* | 5/2006 | Rajagopal et al. | 726/25 |
| 2007/0220256 A1* | 9/2007 | Yasui et al. | 713/171 |

OTHER PUBLICATIONS

3gPP2 S.R0016 Version 2.0, Automatic Call Gapping Stage 1. Dec. 8, 2000.*
Official Action in U.S. Appl. No. 10/234,924 (May 23, 2005).
Official Action in U.S. Appl. No. 10/234,924 (Aug. 13, 2004).
Official Action in U.S. Appl. No. 10/234,924 (Nov. 18, 2003).
CCS#7 Networks Dependability Studies: Phase 2, Network Integrity Aspects and Qualification Techniques—Restart Procedure and Line Oscillation, vol. 1 of 3: Main Report dated Aug. 1998 (38 pages).

(Continued)

*Primary Examiner*—Christopher A Revak
(74) *Attorney, Agent, or Firm*—Jenkins, Wilson, Taylor & Hunt, P.A.

(57) ABSTRACT

Methods and systems for identifying and mitigating telecommunications management message security threats are disclosed. A distributed security screening platform receives management messages from external sources. The distributed security screening platform identifies messages affecting the status of the same managed resource and applies a time-based security policy to these messages. If the messages are determined to violate the time-based security policy, a mitigating action is performed to protect the managed resource.

56 Claims, 10 Drawing Sheets

OTHER PUBLICATIONS

CCS#7 Networks Dependability Studies: Phase 2, Network Integrity Aspects and Qualification Techniques—Restart Procedure and Link Oscillation, vol. 2 of 3: Annex A—Detailed Analysis, dated Aug. 1998 (98 pages).

CCS#7 Networks Dependability Studies: Phase 2, Network Integrity Aspects and Qualification Techniques—Restart Procedure and Link Oscillation, vol. 3 of 3: Annex B—Test Suite Production, dated Aug. 1998 (140 pages).

CCS#7 Networks Dependability Studies: Phase 2,Network Integrity Aspects and Qualification Techniques, dated Aug. 1998 (33 pages).

CCS#7 Networks Dependability Studies: Phase 2, Network Integrity Aspects and Qualification Techniques—Congestion Control and Failure Propagation, vol. 3 of 3: Annex B, Jul. 1998 (138 pages).

CCS#7 Networks Dependability Studies: Phase 2, Network Integrity Aspects and Qualification Techniques—Access Control, vol. 1 of 3: Main Core, dated Jun. 1998, (37 pages).

CCS#7 Networks Dependability Studies: Phase 2, Network Integrity Aspects and Qualification Techniques—Access Control, vol. 2 of 3: Annex A—Protocol Analysis in Access Control, dated Jun. 1998 (44 pages).

CCS#7 Networks Dependability Studies: Phase 2, Network Integrity Aspects and Qualification Techniques—Access Control, vol. 3 of 3: Annex B—Test Suite For Access Control dated Jun. 1998 (50 pages).

* cited by examiner

METHODS AND SYSTEMS FOR IDENTIFYING AND MITIGATING TELECOMMUNICATIONS NETWORK SECURITY THREATS

TECHNICAL FIELD

The present invention relates to methods and systems for telecommunications network security. More particularly, the present invention relates to methods and systems for identifying and mitigating telecommunications network security threats.

RELATED ART

SS7 is the signaling protocol used throughout the world to establish and tear down calls, extract information from databases, and exchange management information between SS7 network nodes. Although security threats in Internet protocol (IP) networks have been widely publicized and studied, threats to the SS7 network are not as well known. In light of the importance of the SS7 protocol to telecommunications, there exists a need for improved methods and systems for identifying SS7 network security threats and for mitigating such threats.

U.S. Pat. No. 6,308,276 (hereinafter, "the '276 patent") discloses an, SS7 firewall system that examines each SS7 message that a signaling node transmits or receives on a signaling link and determines whether or not to pass, modify, respond to, or reject each message. The purpose of the system disclosed in the '276 patent is reducing the likelihood of misuse of resources. For example, in the '276 patent states that 800 number translations might be blocked except for messages with a particular originating point code (OPC). While such a system may be useful to prevent misuse of network resources, there is no disclosure in the '276 patent of methods or systems for identifying specific threats that relate to SS7 management messages, such as network management messages, subsystem management messages, or circuit management messages. In addition, the '276 patent fails to address network performance problems associated with security screening. All of the screening in the '276 patent is disclosed as being performed serially by a single processor of an in-line device.

Commonly assigned, co-pending U.S. patent application Ser. No. 10/234,924 (hereinafter, "the '924 application") discloses methods and systems for enhanced telecommunications network security. According to the '924 Application, messages are screened from a location in the telecommunications network to determine whether messages received from another location in the telecommunications network include the correct origination information. For example, in one embodiment, the system disclosed in the '924 application determines whether the OPC in a received message is an OPC that is associated with a signaling linkset on which the message is received. If the OPC is not associated with the linkset on which the message is received, a network security action is performed. By performing such screening, the system disclosed in the '924 application prevents messages originating from one location in the network from disabling the entire network.

While the system disclosed in the '924 application reduces some threats relating to SS7 management messages, other threats may be present and require preventative measures. Accordingly, there exists a need for improved methods and systems for identifying and mitigating telecommunications network security threats.

DISCLOSURE OF THE INVENTION

According to one aspect of the invention, a method for identifying and mitigating telecommunications management message security threats is disclosed. As used herein, the term "telecommunications management messages" refers to SS7 message transfer part (MTP) network management messages, signaling connection control part (SCCP) subsystem management messages, circuit management messages, and IP telephony (including SIP and H.323) management messages. According to the method, telecommunications management messages are received, and messages that relate to the same managed entity, e.g., the same route, subsystem, or circuit, are identified. Once the management messages that relate to the same managed entity are identified, a time-based security policy is applied to the messages. As used herein, the term "time-based security policy" refers to any security policy that identifies messages as attack messages based on when the messages are sent in relation to each other or in relation to a time interval. One example of a time-based security policy is a policy that counts the frequency of received messages. If application of the time-based security policy indicates that a security threat is present, a mitigating action is taken to reduce or eliminate the security threat.

One example of a time-based security rule that may be applied includes counting the frequency of network management messages that relate to the same signaling route. If the frequency exceeds a predetermined threshold, this may indicate that an attacker is attempting to keep the signaling route out of service. Accordingly, if the frequency threshold for certain types of network management messages is exceeded, the messages may be discarded, and the telecommunications service provider may be notified.

In another example, applying a time-based security policy to a plurality of messages relating to the same managed entity may include identifying oscillations in the state of a signaling route, a subsystem, or a circuit based on a sequence of received management messages. For example, in order to keep a signaling route unavailable, it is necessary to repeatedly send network management messages, such as transfer prohibited (TFP) messages. If the signaling route is not actually unavailable, messages may be received from the node at the distant end of the signaling link associated with the route. The presence of messages from a node at the distant end of a signaling link associated with a route that is supposed to be down within a predetermined time period of a series of TFP messages indicating that the route to the node is down may indicate an attack.

In yet another example, applying a time-based security policy to management messages may include allowing circuit management messages to pass only at predetermined times of day when it would be normal for an operator to send such messages. In addition, even if messages are received during a valid time period, since multiple messages may be required to keep a circuit down, the messages may be thresholded, as described above.

The methods and systems for identifying and mitigating telecommunications network security threats may be implemented in a distributed processing platform including communications modules for interfacing with external signaling links, database service modules for providing database services, and application engines for executing telecommunications applications. Each group of communications modules, database service modules, and application engines may perform a separate portion of the security screening. In one example, the communications link modules, the database service modules, and the application engines may be components of a network routing node, such as a signal transfer point. Because security processing is distributed among multiple processors, the security processing bottleneck is reduced.

Accordingly, it is an object of the invention to provide improved methods and systems for identifying and mitigating telecommunications network security threats.

It is another object of the invention to provide methods and systems for implementing time-based security screening of telecommunications management messages.

It is yet another object of the invention to provide a distributed architecture for telecommunications network security screening and enforcement in which portions of the security processing are distributed among multiple processing modules.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF PREFERRED EMBODIMENTS

Figure 1:
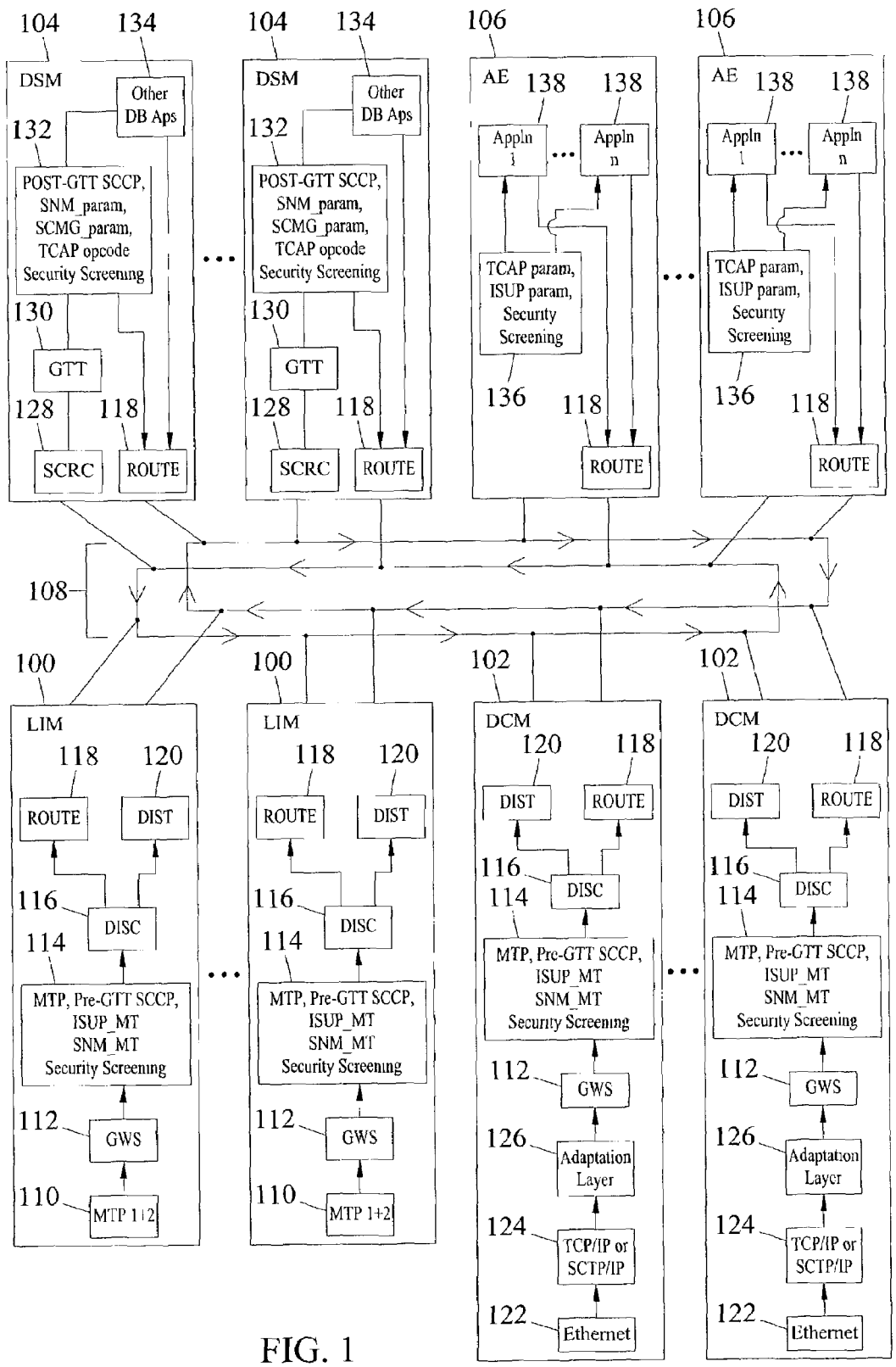
FIG. 1 is a block diagram of a distributed architecture for identifying and mitigating telecommunications network security threats according to an embodiment of the present invention.

As described above, the present invention is preferably implemented in a distributed architecture such that portions of the security screening processing are distributed among multiple processors to minimize the security processing bottleneck. FIG. 1 is a block diagram illustrating an exemplary distributed architecture for security screening processing according to an embodiment of the present invention. Referring to FIG. 1, the distributed architecture includes a plurality of processing modules connected by a bus. In the illustrated example, the processing modules include link interface modules (LIMs) 100 for sending and receiving SS7 messages over SS7 signaling links, data communications modules (DCMs) 102 for sending and receiving internet protocol messages over Internet protocol connections, database service modules (DSMs) 104 for performing database-related processing of signaling messages, and application engines (AEs) 106 for executing telecommunications applications, such as ISUP or TCAP applications. The processing modules illustrated in FIG. 1 are connected by a bus 108, which includes a pair of counter rotating dual rings. Each communications module, processing module, and application engine illustrated in FIG. 1 may include a communications processor for controlling communications over bus 108 and an application processor for executing telecommunications applications. As will be described in detail below, each module illustrated in FIG. 1 may implement a portion of telecommunications security screening. Because such processing is distributed among multiple processors, latency introduced by security screening is minimized.

In FIG. 1, link interface modules 100, data communications modules 102, and application engines 106 may be components of a telecommunications signaling message routing node, such as a signal transfer point, and security screening functions may be implemented on each module. However, the present invention is not limited to screening signaling messages from within a signaling message routing node. For example, in an alternate embodiment of the invention, the security screening functions illustrated in FIG. 1 may be implemented on an external monitoring platform that receives signaling messages copied internally from within a telecommunications network routing node or from link probes coupled to signaling links connected to a telecommunications network routing node. An example of a monitoring platform suitable for use with embodiments of the present invention is the Sentinel™ platform available from Tekelec of Calabasas, Calif.

In FIG. 1, link interface modules 100 include a message transfer part (MTP) level 1 and 2 function 110, a gateway screening function 112, a security screening function 114, a discrimination function 116, a routing function 118, and a distribution function 120. MTP level 1 and 2 function 110 performs error detection, error correction, and sequencing of SS7 signaling messages. Gateway screening function 112 screens signaling messages based on MTP header information in the messages. Security screening function 114 implements a first portion of the security screening according to an embodiment of the present invention. In the illustrated example, security screening function 114 performs MTP level screening, pre-global title translation (GTT) signaling connection control part (SCCP) screening, ISDN user part (ISUP) message type screening, and signaling network management (SNM) message type screening.

Discrimination function 116 screens messages to determine whether the message are addressed to the routing node that includes modules 100, 102, 104, and 106 or to another node. If messages are addressed to the same node that includes these modules, discrimination function 116 may forward the messages to distribution function 120, which distributes the messages for further internal processing. If a message is addressed to another node, discrimination function 116 may forward the message to routing function 118 to be routed over the appropriate outbound signaling link.

Data communications modules 102 each include an Ethernet function 122 for sending and receiving Ethernet frames, a TCP/IP or SCTP/IP function for sending and receiving TCP/IP or SCTP/IP messages, an adaptation layer 126 for interfacing between SS7 and Internet protocols, a security screening function 114 for performing first level of security processing, a discrimination function 116, a routing function 118, and a distribution function 120, each of which perform similar functions to the correspondingly numbered modules described above with regard to LIMs 100.

As indicated above, adaptation layer 126 may perform functions for interworking between SS7 and IP protocols. For example, if layer 124 includes TCP/IP functions, adaptation layer 126 may include transport adapter layer interface functions, as defined in IETF RFC 3094. In addition or alternatively, if layer 124 includes SCTP/IP functions, adaptation layer 126 may include M2UA, M3UA, SUA, and/or M2PA functions, as defined in the correspondingly named IETF Internet Drafts and RFCs.

Security screening modules 114 of DCMs 102 may perform similar functions to security screening modules 114 of LIMs 100. These security screening functions include MTP level security screening, pre-GTT SCCP screening, ISUP message type screening, and signaling network management message type screening. Specific examples of screening functions to protect the SS7 network will be described in detail below.

Database service modules 104 include SCCP and database related functions. In the illustrated example, each database service module 104 includes a signaling connection routing controller (SCRC) 128, a global title translation function 130, a security screening function 132, other database applications 134, and a routing function 118. SCRC 128 receives SCCP messages forwarded from communications modules 100 and 102 via bus 108 and determines the appropriate type of SCCP processing required for the messages. For example, if a message requires global title translation, SCRC 128 may invoke GTT function 130 to perform global title translation of the message. Security screening function 132 may perform a second level of security screening different from the security screening performed by security screening functions 114. In the illustrated example, security screening function 132 performs post-GTT SCCP security screening, signaling network management message parameter screening, SCCP subsystem management (SCMG) message parameter screening, and transaction capabilities application part (TCAP) opcode screening. Other database applications 134 may include a local number portability function for performing LNP translations, a mobile number portability function for performing mobile number portability translations, or any other suitable telephony database related application. Routing function 118 may route MTP messages to communications modules over bus 108 for transmission over outbound signaling links.

Applications engines 106 each include a security screening function 136, applications 138, and a routing function 118. Security screening function 136 preferably performs security screening operations that are different from those performed by security screening functions 114 and 132. In the illustrated example, security screening functions 136 perform TCAP and ISUP parameters security screening. Security screening functions 136 may also perform IP-telephony security screening based on IP-telephony management messages, such as SIP management messages or H.323 management messages. Applications 138 may be any suitable telephony applications, such as call screening applications, application level security functions, TCAP database applications or IP telephony applications. Routing function 118 MTP-routes messages to the appropriate communications module for transmission over an outbound signaling link.

Figure 2:
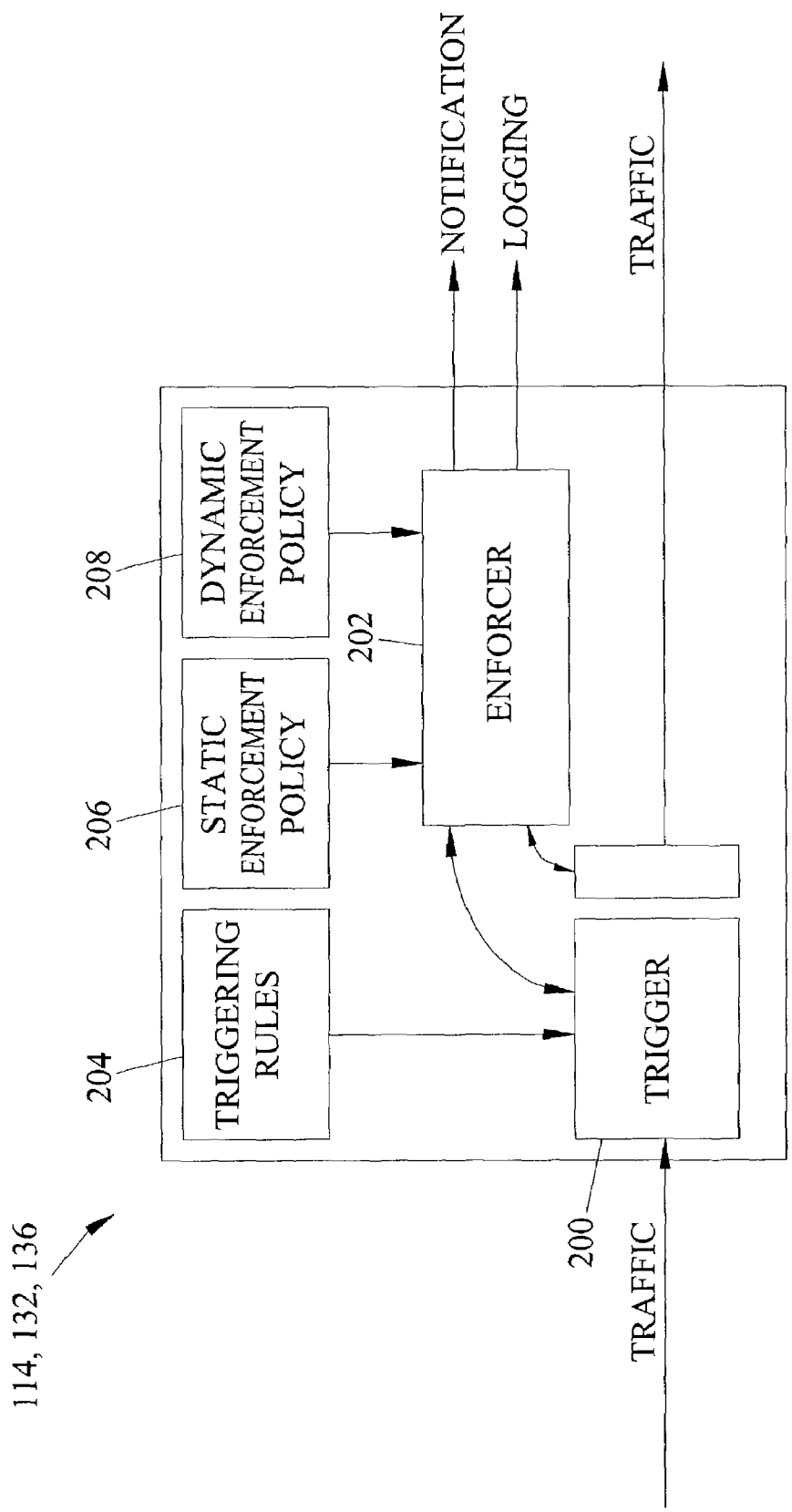
FIG. 2 is a block diagram of a telecommunications security screening and enforcement module according to an embodiment of the present invention.

FIG. 2 is a block diagram of an exemplary internal architecture for security screening functions 114, 132 and 136. Referring to FIG. 2, each security screening function may include a trigger function 200, an enforcer function 202, triggering rules 204, and static and dynamic enforcement policies 206 and 208. Trigger function 200 receives message traffic and determines whether the message traffic matches one or more predefined triggers defined by triggering rules 204. Enforcer function 202 enforces security policies defined in static and dynamic enforcement policies 206 and 208. For example, enforcer 202 may be notified by trigger function 200 when a message matches a particular trigger and may either block the message, send notification to a network operator, initiate throttling (described below), request confirmation from the operator before passing the message, and/or log the message.

As stated above, triggering rules 204 may be applied by each trigger function 200. Triggering rules 204 may differ depending on where the security module is located within the distributed architecture illustrated in FIG. 1. For example, LIM triggering rules may differ from DSM triggering rules. Static enforcement policies 206 may include enforcement policies that are not likely to change over a long period of time. For example, static enforcement policies 206 may include firewall policies and flood control policies. Dynamic enforcement policies 208 may include user defined enforcement policies, which may be changed on-the-fly by a telecommunications service provider.

Figure 3:
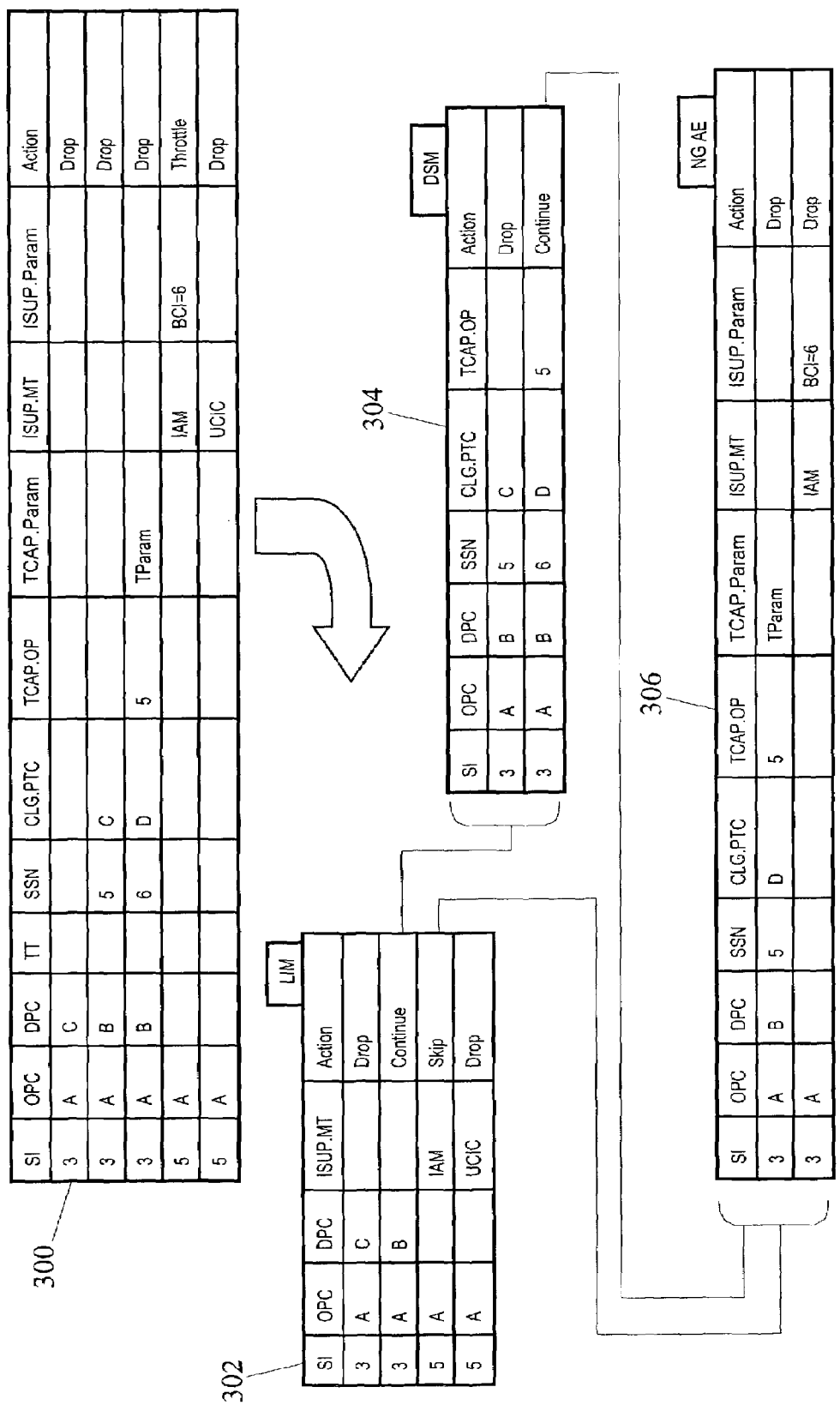
FIG. 3 is a block diagram of distributed security triggers for identifying and mitigating telecommunications network security threats according to an embodiment of the present invention.

In a preferred embodiment of the invention, security triggers are distributed among multiple processing modules in a hierarchical manner to distribute security processing and reduce the bottleneck caused by security processing. FIG. 3 illustrates an example of distribution of security triggers according to an embodiment of the present invention. In FIG. 3, table 300 represents security triggers that may be specified by a telecommunications service provider. The security triggers include service indicator (SI) trigger criteria, originating point code (OPC) trigger criteria, destination point code (DPC) trigger criteria, translation type (TT) trigger criteria, subsystem number (SSN) trigger criteria, calling party code (CLG.PTC) trigger criteria, TCAP opcode (TCAP.OP) trigger criteria, TCAP parameter (TCAP.param) trigger criteria, ISUP message type (ISUP.MT) trigger criteria, ISUP parameters (ISUP.param) trigger criteria, and corresponding enforcement actions. In conventional systems, such as that described in U.S. Pat. No. 6,308,276, all of the security screening functions are performed iteratively by a single centralized processor. Such centralized processing can overload the centralized processor. According to the present invention, portions of the triggers defined in table 300 are divided among multiple processors. For example, table 302 illustrates triggers defined in table 300 that may be implemented on LIMs 100 illustrated in FIG. 1. In table 302, these triggers include triggers relating to SI, OPC, DPC, and ISUP.MT parameters. It is important to note that some triggers defined in table 302 will result in a message being dropped if the trigger conditioned is matched. As a result, processing load on downstream processors is reduced. For those trigger conditions for which the trigger action is to continue security screening processing, the messages may be forwarded to the next processor in the hierarchy of processors for further security screening.

In FIG. 3, the next level of security screening is indicated by triggers 304 which may be implemented on DSMs 104 illustrated in FIG. 1. Triggers 304 include the same SI, OPC, and DPC parameters identified in table 302. However, as will be described in more detail below, decoding of the message to extract these parameters is preferably performed by LIM 100 and passed along with the message as a distributed decode key. This further reduces the processing bottleneck introduced by security screening. In addition to the SI, OPC, and DPC parameters, table 304 defines subsystem number, calling party code, TCAP opcode, and corresponding trigger actions. If the action specifies drop, the message is dropped and no further security screening is performed. If the trigger action is continued, the message may be forwarded an application engine 106 for further security screening.

Table 306 in FIG. 3 illustrates exemplary application engine triggers. In FIG. 3, each trigger includes SI, OPC, DPC, SSN, calling party code, and TCAP opcode parameters specified by the corresponding DSM trigger. In addition, each trigger defined in table 306 may include TCAP parameter trigger criteria, ISUP message type trigger criteria, ISUP parameter trigger criteria, and a corresponding enforcement action. If IP telephony messages are received by application engine 106, Table 306 may include rules for identifying IP telephony management messages, including SIP and H.323 management messages. If an application engine 106 receives a message from a DSM 104 for which further security screening processing is required, the message preferably includes a decode key including the SI, OPC, DPC, SSN, CLG.PTC, and TCAP.OP parameters decoded by LIM 100 and DSM 104 to reduce duplicate processing downstream.

Figure 4:
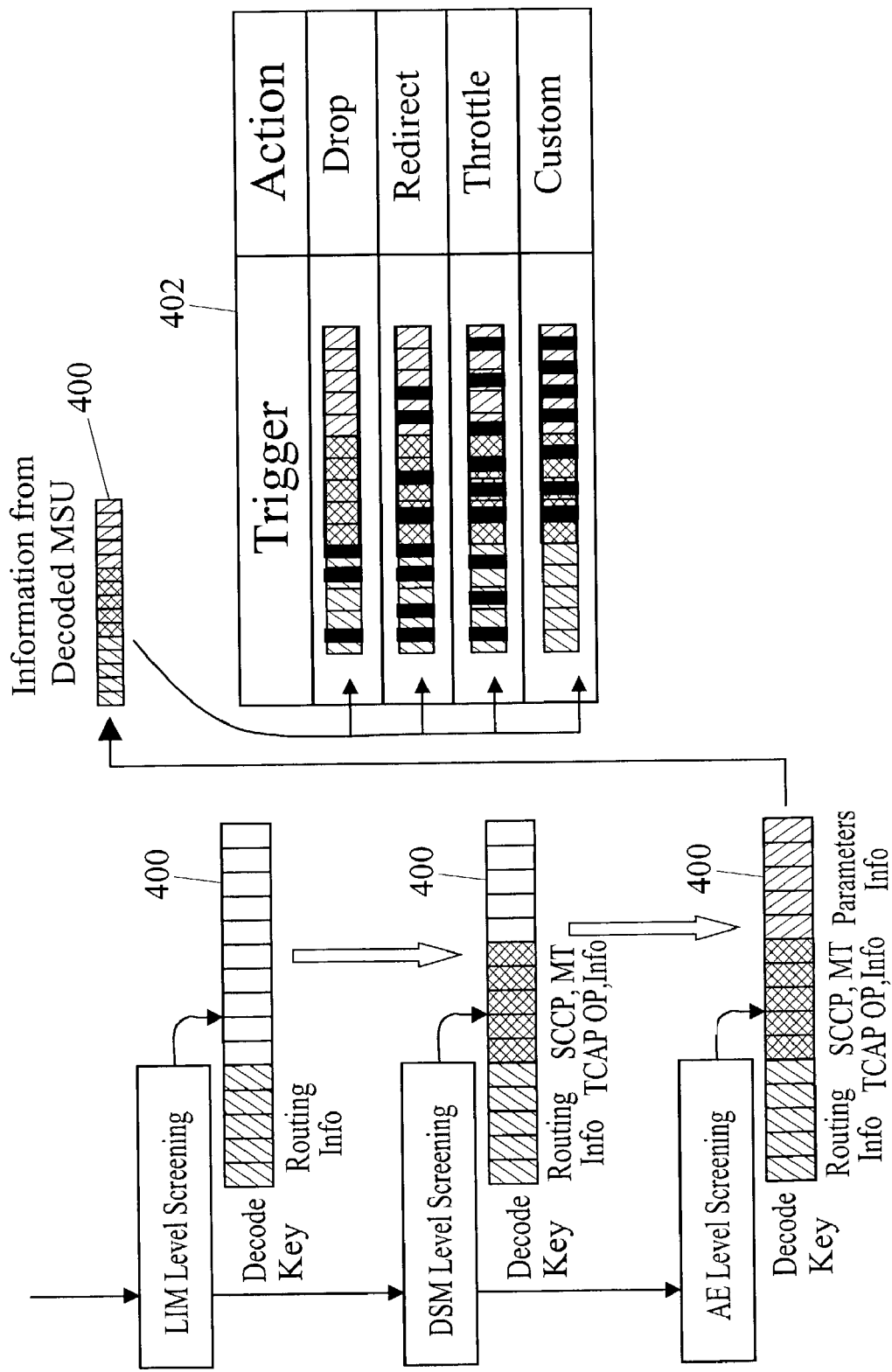
FIG. 4 is a block diagram of distributed security decode key according to an embodiment of the present invention.

FIG. 4 further illustrates the concept of a distributed decode key that is transmitted along with a message as it passes through various levels of security screening. A distributed decode key may be a data structure sent along with the message that stores parameters extracted from the message in to reduce duplicate message decoding. This data structure and a process for creating this data structure is described in detail in commonly assigned, co-pending U.S. Provisional Patent Application No. 60/377,866 filed May 5, 2002, the disclosure of which is incorporated herein by reference in its entirety. In the example illustrated in FIG. 4, after LIM level screening, decode key 400 may include LIM level routing information such as OPC, DPC, and SI. After DSM level screening, decode key 400 may include additional parameters, such as SCCP parameters, ISUP message type parameters, and TCAP opcode parameters. After application engine screening, decode key 400 may include additional TCAP and ISUP parameters. Table 402 graphically illustrates trigger criteria and corresponding actions that may be applied to a message based on decode key 400. In table 402, each shaded bar represents trigger criteria for the corresponding bar in decode key 400. Because decode key 400 is preferably of a fixed format with fixed-length fields, the application of decode key 400 to a trigger in table 402 can be a simple arithmetic operation that requires a small number of processor cycles. Thus, by using a distributed decode key, the present invention reduces the latency required for telecommunications security processing.

Figure 5:
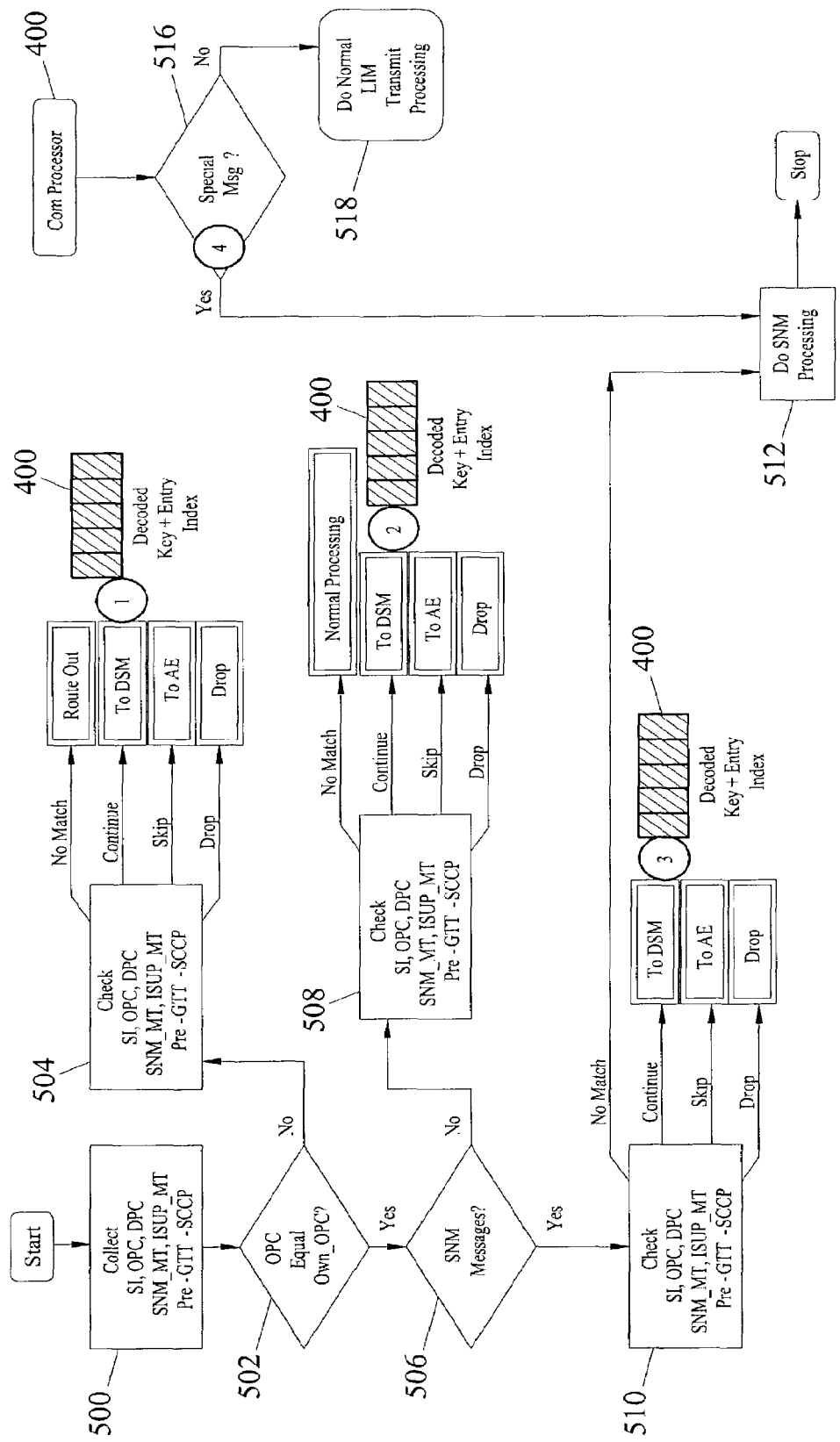
FIG. 5 is a flow chart illustrating exemplary link interface module (LIM) level security processing according to an embodiment of the present invention.

FIG. 5 illustrates exemplary security processing that may be performed by security functions 114 on LIMs 100. Referring to FIG. 5, in step 500, security functions 114 collect SI, OPC, DPC, SNM message type, ISUP message type, and pre-GTT SCCP parameters from a received signaling message. In step 502, security screening modules 114 determine whether the OPC in a received message is equal to the OPC of the node in which security screening modules 114 are located. This check is performed to reduce the risk of certain types of spoofing where a false source address is inserted into an SS7 message. If the OPC is not equal to the OPC of the receiving node, the message is not spoofed. Accordingly, control proceeds to step 504 where security screening modules 114 check SI, OPC, DPC, SNM message type, ISUP message type, and pre-GTT SCCP parameters with regard to the trigger criteria defined at the LIM level. The result of processing step 504 may be no match, continue, skip, or drop, depending on the enforcement actions defined at the LIM level. If the result of the security screening is to continue processing, the message may be forwarded to the appropriate next level security function along with the appropriate decode key 400. In step 502, if the OPC is equal to the OPC of the receiving node, control proceeds to step 506 where it is determined whether the message is a signaling network management message. If the message is not a signaling network management message, control proceeds to step 508 where the SI, OPC, DPC, SNM message type, ISUP message type, and pre-GTT SCCP parameters are compared against the LIM level triggers, and the corresponding trigger actions are applied. If the message is forwarded to another module for further processing, the decode key 400 is preferably forwarded along with the message.

In step 506, if the messages are determined to be network management messages, control proceeds to step 510 where security screening functions 114 check the SI, OPC, DPC, signaling network management message type, ISUP message type, and pre-GTT SCCP parameters against the LIM level trigger criteria. If the messages matches one of the trigger criteria, the corresponding trigger action is applied. If the action is to forward the message for additional security screening, the message is preferably passed to the appropriate processing module along with decode key 400. If no match occurs, control proceeds to step 512 where normal signaling network management processing is performed.

In addition to processing inbound messages, LIMs 100 process network management messages from other modules destined for outbound signaling links and those that are to be processed internally and not sent over outbound signaling links. These messages may be received by the communications processor connected to bus 108. Accordingly, in FIG. 5, block 514 represents receipt of a network management message from the communications processor for outbound or internal processing. In step 516, it is determined whether the message is a special message that it is not to be routed on an outbound signaling link, such as a network management message relating to an internal point code (IPC) assigned to a remote IP application that shares a point code with the node performing the LIM level processing. Another example of a network management message that may be processed internally is a network management message addressed to or that concerns any point code terminated by a telecommunications network routing node, such as an STP, that receives the network management message. If the message is a network management message addressed to or concerning an IPC or other self point code, control proceeds to step 512 for normal signaling network management message processing. If the message is not a network management message addressed to or concerning a self point code, control proceeds to step 518 where the message is transmitted on the outbound signaling link.

Although the steps illustrated in FIG. 5 have been described primarily in terms of LIMs 100, it is understood that security screening functions 114 on DCMs 102 may perform similar steps to screen inbound SS7 messages received over an IP network, outbound SS7 messages to be sent over an IP network, and network management messages to be processed internally.

Figure 6:
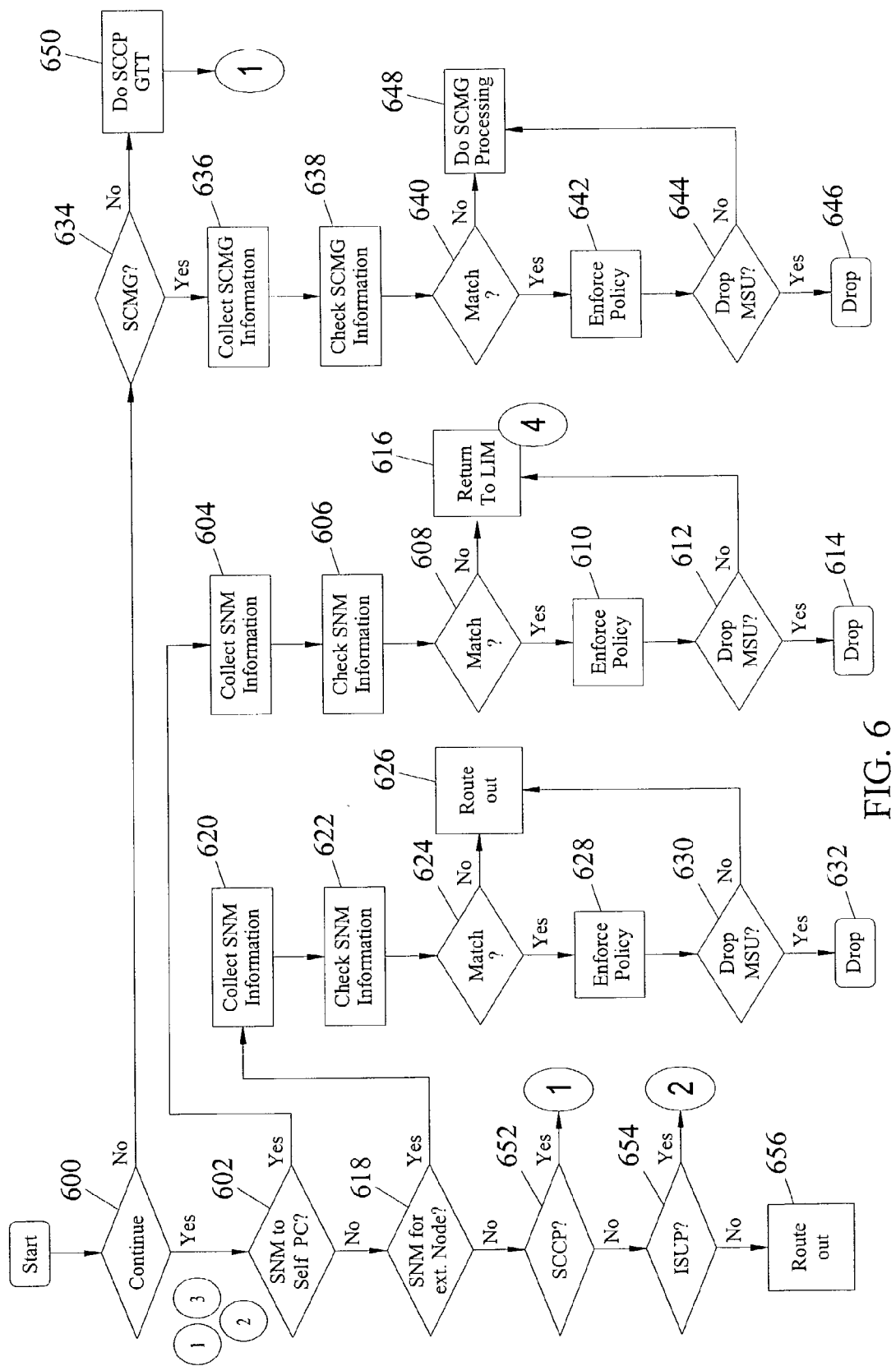
FIG. 6 is a flow chart illustrating exemplary database service module (DSM) level security processing according to an embodiment of the present invention.

FIG. 6 illustrates exemplary security screening processing that may be performed by security screening functions 132 on DSMs 104. Referring to FIG. 6, in step 600 it is determined whether to continue security screening processing. Messages for which security screening may be continued include those message identified by circles 1, 2, and 3 in FIG. 5 for which partial security screening was performed at the LIM level and the result of the security screening was "continue."

If it is determined that prior security screening should be continued for the message, control proceeds to step 602 where it is determined whether the message is a signaling network management message that is addressed to or that concerns a self point code. If the message is a signaling network management message addressed to or concerning a self point code, control proceeds to step 604 where security screening functions 132 collect signaling network management information from the message. In step 606, security screening functions 132 check the signaling network management information in the message against the DSM level trigger criteria. In step 608, if the message matches a DSM level trigger, control proceeds to step 610 where the security policy is enforced. In step 612, security screening function 132 determines whether or not to drop the MSU. If the result of enforcement of the policy is to drop the MSU, the message is dropped (step 614). If in step 608 the message does not match the DSM level trigger or, in step 612, if the message is not dropped, control proceeds to step 616 where the message is returned to the LIM for normal signaling network management processing.

Returning to step 602, if the message is determined not to be a signaling network management message addressed to or concerning a self point code, control proceeds to step 618 where it is determined whether the message is a signaling network management message destined for an external node. If the message is a signaling network management destined for an external node, control proceeds to step 620 where signaling network management information is collected from the message. In step 622, the signaling network management message parameters in the message are to compared to the DSM level trigger criteria. In step 624, if the message parameters do not match one of the trigger criteria, control proceeds to step 626 where the message is routed to its intended destination over an external signaling link. If, however, the message is determined to match one of the trigger criteria, control proceeds to step 628 where the security policy is enforced. In step 630, if the result of enforcement of the security policy is to drop the MSU, control proceeds to step 632 where the MSU is dropped. If the result of enforcement of the security policy is not to drop the MSU, control proceeds to step 626 where the message is routed over an outbound signaling link.

Returning to step 600, if it is determined that the message is not a message that requires continuation of prior security screening, control proceeds to step 634 where security screening functions 132 determine whether the message is an SCCP subsystem management message. If the message is an SCCP subsystem management message, control proceeds to step 636 where SCCP subsystem management information is collected from the message. In step 638, the SCCP subsystem management information is compared to the, DSM level trigger. In step 640, if the result of the comparison results in a match of one of the DSM level triggers, control proceeds to step 642 where security screening function 132 enforces the policy. In step 644, if the result of enforcing the policy is to drop the MSU, control proceeds to step 646 where the message is dropped. If the result of screening is not to drop the MSU or if the MSU does not match the SCMG screening criteria, control proceeds to step 648 where normal SCMG processing is performed.

Returning to step 634, if security screening function 132 determines that the message is not an SCMG message, control proceeds to step 650 where global title translation and post-GTT security screening is initiated for the message. Post-GTT security screening will be described below with regard to FIG. 7.

Returning to step 618, if the message is determined not to be a signaling network management message for an external node, control proceeds to step 652 where it is determined whether the message is a SCCP message. If the message is an SCCP message, global title translation of the message is initiated. In step 652, if the message is not a SCCP message, control proceeds to step 654 where it is determined whether the message is an ISUP message. If the message is an ISUP message, DSM level ISUP screening is initiated, which will be described in detail below with regard to FIG. 7. If the message is not an ISUP message, control proceeds to step 656 where the message is routed over an outbound signaling link.

Figure 7:
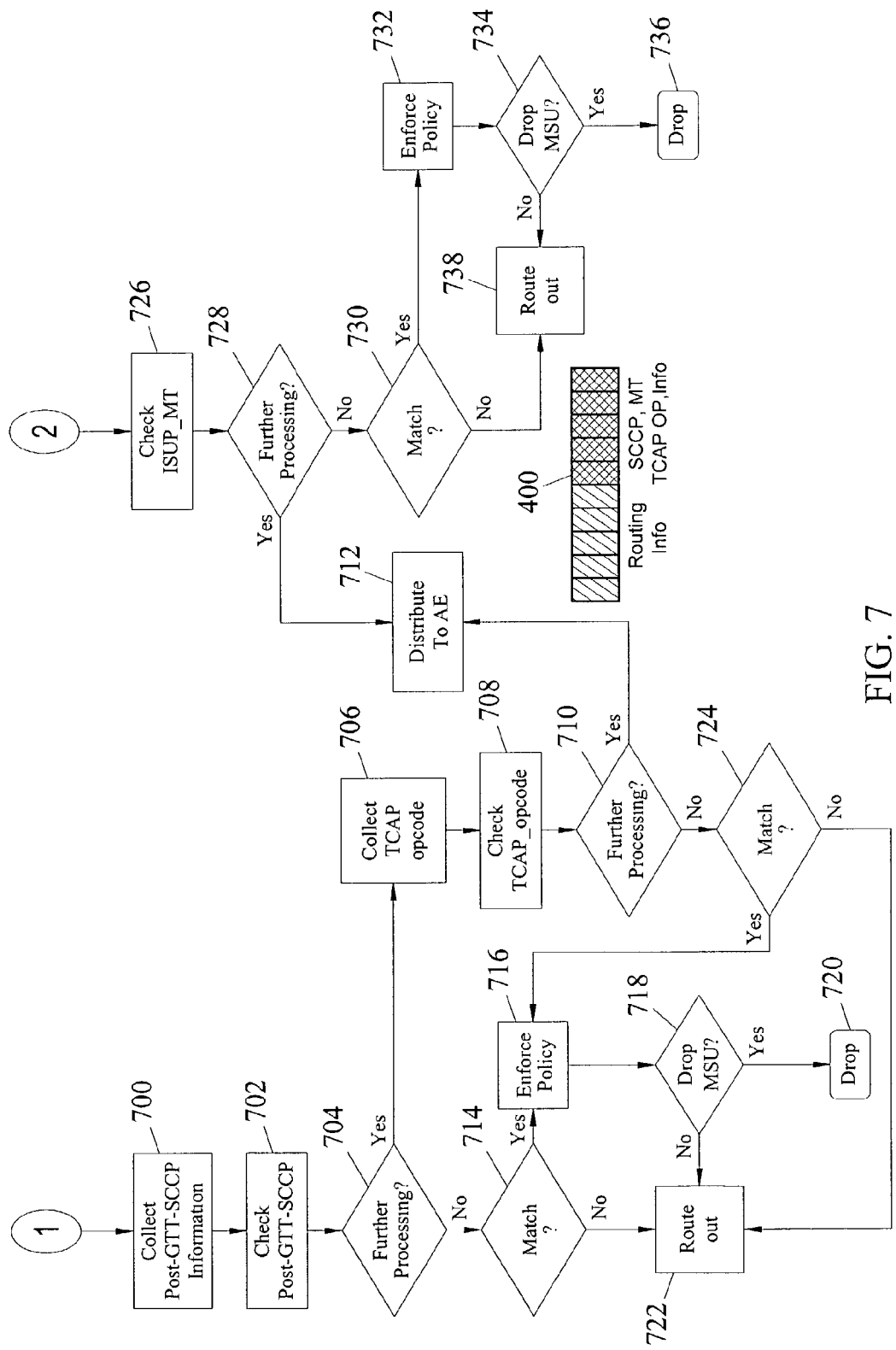
FIG. 7 is a flow chart illustrating additional DSM level security processing according to an embodiment of the present invention.

FIG. 7 illustrates exemplary DSM level post-GTT SCCP and ISUP screening. Connector 1 in FIG. 7 illustrates the steps performed for post-GTT SCCP security screening. From connector 1 in FIG. 7, control proceeds to step 700 where post-GTT SCCP information, such as the point code and subsystem number resulting from a global title translation, is collected. In steps 702 and 704, it is determined whether the post-GTT SCCP parameters indicate that further processing within the routing node that contains DSMs 104 is required. An example of when further processing is required may be when the result of the GTT is a subsystem that is within the routing node that contains DSMs 104. If the post-GTT SCCP parameters indicate that further processing is required, control proceeds to step 706 where the TCAP opcode is extracted from the message. In steps 708 and 710, it is determined whether the TCAP opcode indicates that further TCAP processing is required. If the TCAP opcode indicates that further TCAP processing is required, control proceeds to step 712 where the message, along with decode key 400, is distributed to the appropriate application engine 106 for application level security screening and TCAP processing.

Returning to step 704, if the post-GTT SCCP parameters do not indicate that further processing is required, control proceeds to step 714 where it is determined whether the post-GTT SCCP parameters match any of the SCCP level security screening criteria. If the message matches one of the post-GTT SCCP security screening triggers, control proceeds to step 716 where the security policy is enforced. In step 718, if the result of the security policy is to drop the MSU, control proceeds to step 720 where the message is dropped. If the result of applying the security policy is not to drop the MSU, in step 722, the message is routed to its intended destination.

Returning to step 710, if the TCAP opcode from a message indicates that further processing is not required, control proceeds to step 724 where it is determined whether the post-GTT SCCP parameters in the message match any of the DSM level security triggers. If the parameters match one of the security triggers, steps 716 through 722 are repeated. If the parameters do not match any of the security triggers, control proceeds to step 722 where the message is routed out over an outbound signaling link.

If the received message is determined to require ISUP processing, control proceeds to step 726 in FIG. 7 through connector 2 in FIG. 6. Referring to step 726, the ISUP message type is checked. In step 728, it is determined whether the ISUP message type indicates that further ISUP processing is required. If further ISUP processing is required, control proceeds to step 712 where the message is distributed to appropriate application engine for ISUP processing. In step 728, if the message type indicates that further ISUP processing is not required, control proceeds to step 730 where it is determined whether the message matches any of the DSM level ISUP triggers. If the message matches one of the triggers, control proceeds to step 732 where the security policy is enforced. In step 734, if enforcement of the security policy results in dropping the MSU, control proceeds to step 736 where the MSU is dropped. If the result of enforcement of the security policy is not to drop the MSU, or in step 730, if the MSU does not match any of the DSM level ISUP related security triggers, control proceeds to step 738 where the message is routed over an outbound signaling link. Thus, as illustrated in FIG. 7, a DSM may perform post-GTT SCCP, TCAP opcode, and ISUP message type security screening.

Figure 8:
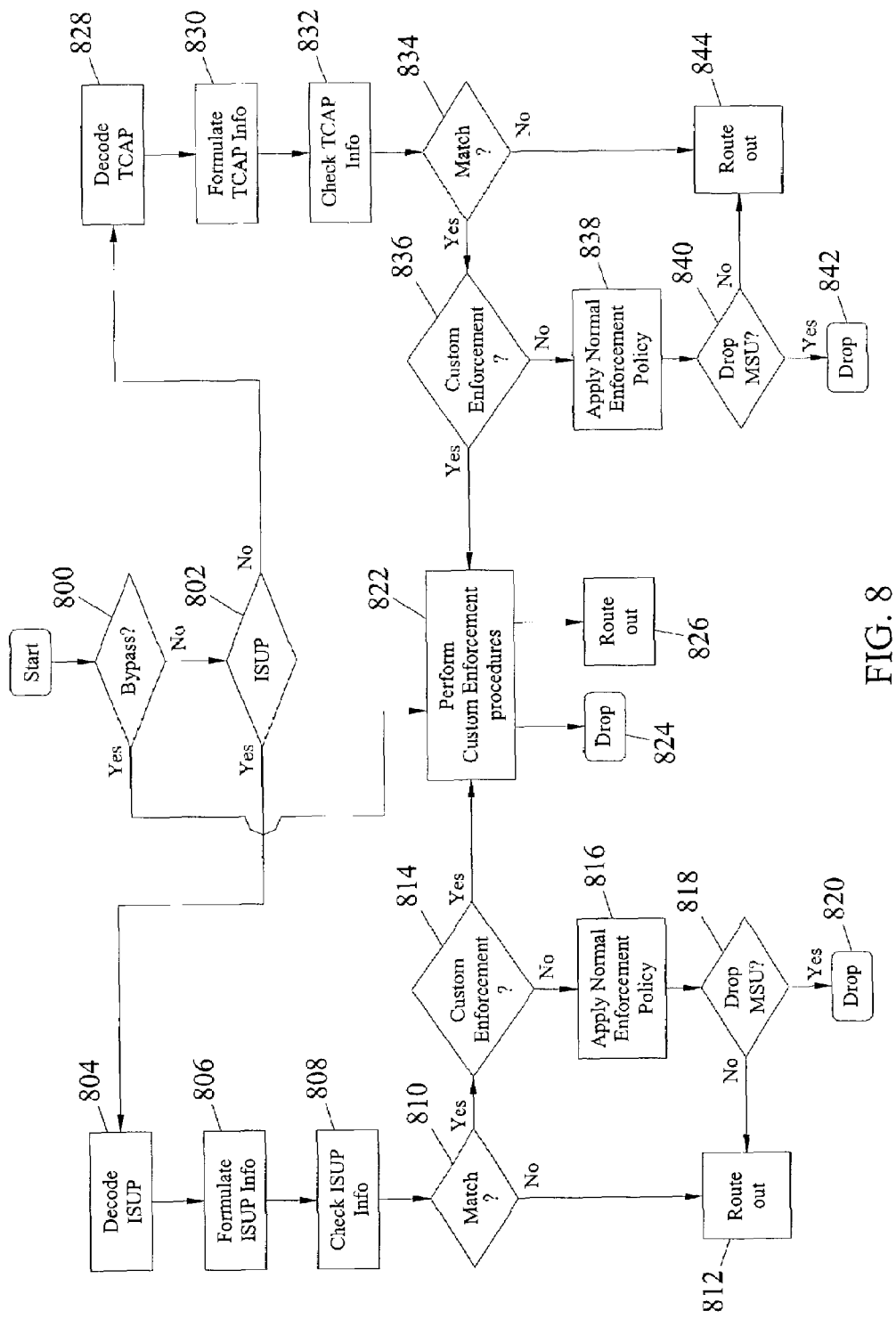
FIG. 8 is a flow chart illustrating exemplary application engine (AE) security processing according to an embodiment of the present invention.

FIG. 8 is a flow chart illustrating exemplary security processing that may be performed by an application engine 106 according to an embodiment of the present invention. Referring to FIG. 8, in step 800, it is determined whether the message should bypass normal processing and be screened for security purposes. Messages that should bypass normal processing may include messages affecting circuits for other critical network resources. In step 802, it is determined whether the message is an ISUP message. If the message is an ISUP message, control proceeds to step 804 where the ISUP portion of the message is decoded. In step 806, an ISUP decode key is formulated. In step 808, the ISUP decode key is compared to application level ISUP triggers. In step 810, if the decode key does not match any of the triggers, control proceeds to step 812 where the message is routed out over an external network.

If, however, the message matches one of the security triggers, control proceeds to step 814 where it is determined whether a custom enforcement policy exists. If a custom enforcement policy does not exist, control proceeds to step 816 where a normal enforcement policy is applied. In step 818, if the result of the application of the normal enforcement policy is to drop the message, in step 820, the message is dropped. If the result of the application of the normal enforcement policy is not to drop the message, the message is routed over an external signaling link.

Returning to step 800, if the message is identified as a message that should bypass normal processing, control proceeds to step 822 where custom enforcement procedures are applied. The result of the custom enforcement procedures may be to drop the message, as indicated in step 824, or to route the message over an external signaling link, as indicated in step 826.

If in step 802, the message is determined not to be an ISUP message, in this example, it is assumed that the message is a TCAP message. Accordingly, control proceeds to step 828 where TCAP portion of the message is decoded. In step 830, the TCAP decode key is created. In step 832, the TCAP decode key is compared to application engine level triggers. In step 834, if the message matches one of the triggers, control proceeds to step 836 where it is determined whether a custom enforcement policy exists. If a custom enforcement policy exists, control proceeds to steps 822, 824, and 826 where the custom enforcement policy is applied. If a custom enforcement policy does not exist, control proceeds to step 838 where a normal enforcement policy is applied. In step 840, if the application of the normal enforcement policy is to drop the message, in step 842 the message is dropped. If the result of the normal enforcement policy is not to drop the message, in step 844, the message is routed over an external signaling link. Thus, as illustrated in FIG. 8, application level security screening processing according to the present invention may include ISUP and TCAP parameter screening and applying custom and built-in or standard security policies.

Although the steps in FIG. 8 illustrate ISUP and TCAP security screening performed by an application engine, the present invention is not limited to performing only ISUP and TCAP security screening at the application engine. For example, an application engine may be configured to perform screening based on IP telephony management and call signaling messages, including session initiation protocol (SIP) and H.323 messages. The steps for performing such security screening would be similar to those illustrated in FIG. 8. That is, a decode key would be formulated according to the IP telephony signaling message type and compared against security screening criteria tailored to the IP telephony signaling message type.

As described briefly above, one security threat in SS7 network relates to sequences of SS7 management messages intended to keep a managed resource out of service. Because SS7 network resources are resilient, meaning that normal network management procedures attempt to correct failures, repeated transmission management messages may be required to keep a resource out of service. Accordingly, the security screening functions of the present invention preferably identify such repetitive messages intended to keep a resource out of service and perform a mitigating action to stop such messages from disabling a resource.

Figure 9:
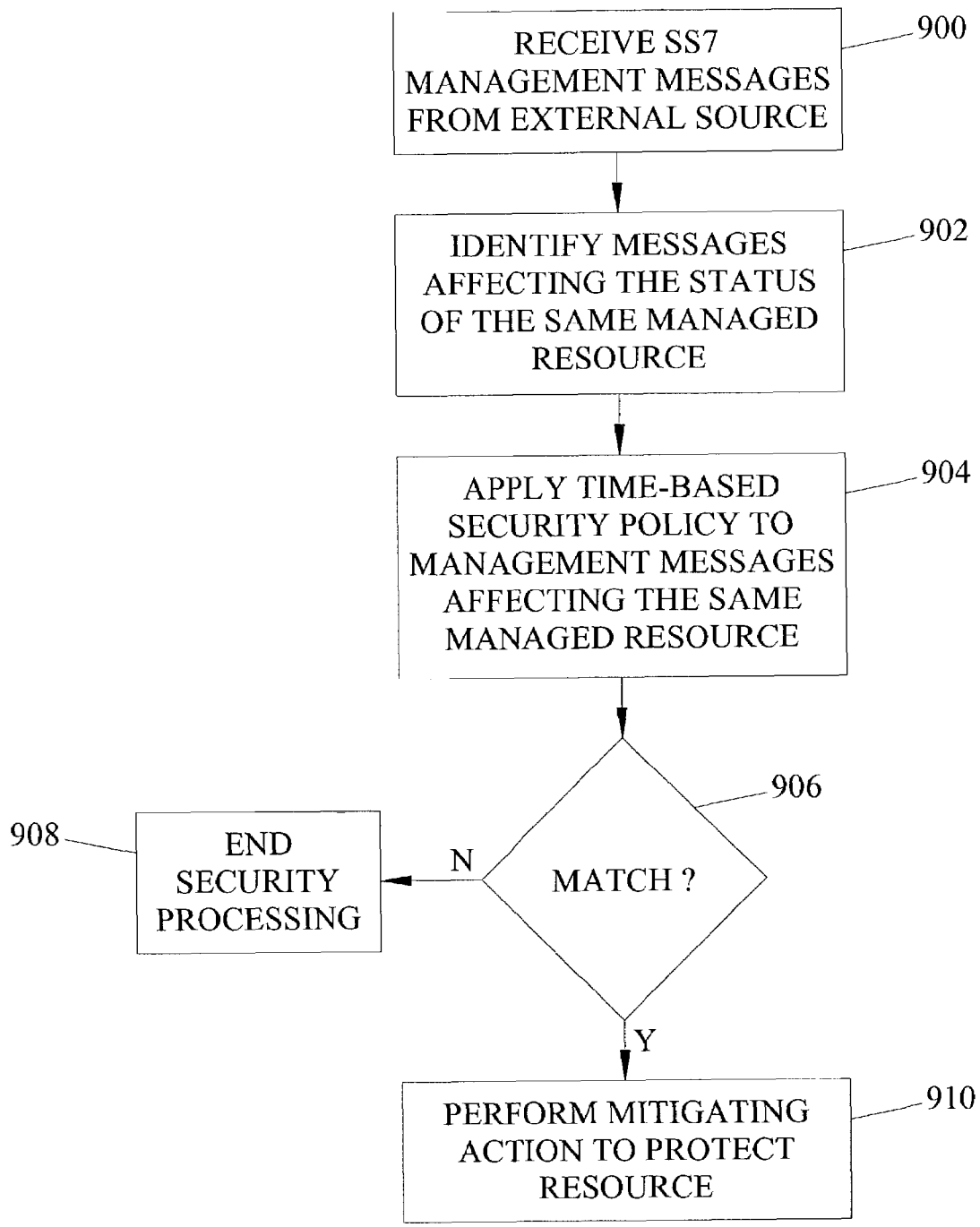
FIG. 9 is a flow chart illustrating exemplary steps for time-based security screening of management messages according to an embodiment of the present invention.

FIG. 9 illustrates exemplary steps that may be performed by security screening functions 114, 132, and 136 in identifying repetitive management message attacks and mitigating the harm caused by these attacks. Referring to FIG. 9, in step 900, SS7 management messages are received from an external source. In step 902, messages that affect the status of the same managed resource are identified. For example, if the managed resource is a signaling link or a signaling link cluster, transfer prohibited (TFP), transfer controlled (TFC), transfer cluster restricted (TCR), transfer cluster prohibited (TCP), or link inhibited messages relating to the same route, signaling link, signaling link group, remote node, group of remote nodes, or customer premises equipment, such as a PBX, media gateway or media server, may be identified. If the managed resource is a subsystem, subsystem prohibited (SSP) messages relating to the same subsystem may be identified. If the managed resource is a circuit or circuit group, block (BLK), circuit group block (CGB), reset circuit (RSC), circuit group restricted (CGR), or unavailable CIC (UCIC) messages may be identified. If the managed resource is a database, automatic call gapping (ACG) messages may be identified.

Once messages relating to the same managed resource are identified, in step 904, a time-based security policy is applied to the messages. For example, because repeated transmission of the above-referenced messages may be required to sustain outage of a particular message resource, applying a time-based security policy may include counting the frequency of such messages or detecting oscillation in status of the managed resource. If the managed resource is a signaling route, repeated transmission of a transfer prohibited message may be required to keep the link down. If the frequency of such messages exceeds a predetermined threshold, the sequence of transfer prohibited messages may be identified as an attack (step 906). In another example, the status of the link may oscillate between available and unavailable if the route is actually up and an attacker is trying to keep the route unavailable by sending repeated transfer prohibited messages. If oscillation in route status is detected, an attack may be indicated.

If the messages do not match or violate the time-based security policy, control proceeds to step 908 where security processing ends. If the sequence of messages matches or violates the time-based security policy, in step 910, a mitigating action is performed to protect the managed resource. Exemplary mitigating actions may include blocking the SS7 management messages relating to the same managed resource, notifying a network operator, requesting pre-confirmation from the operator to apply to future messages, throttling the messages, and/or logging the event.

Figure 10:
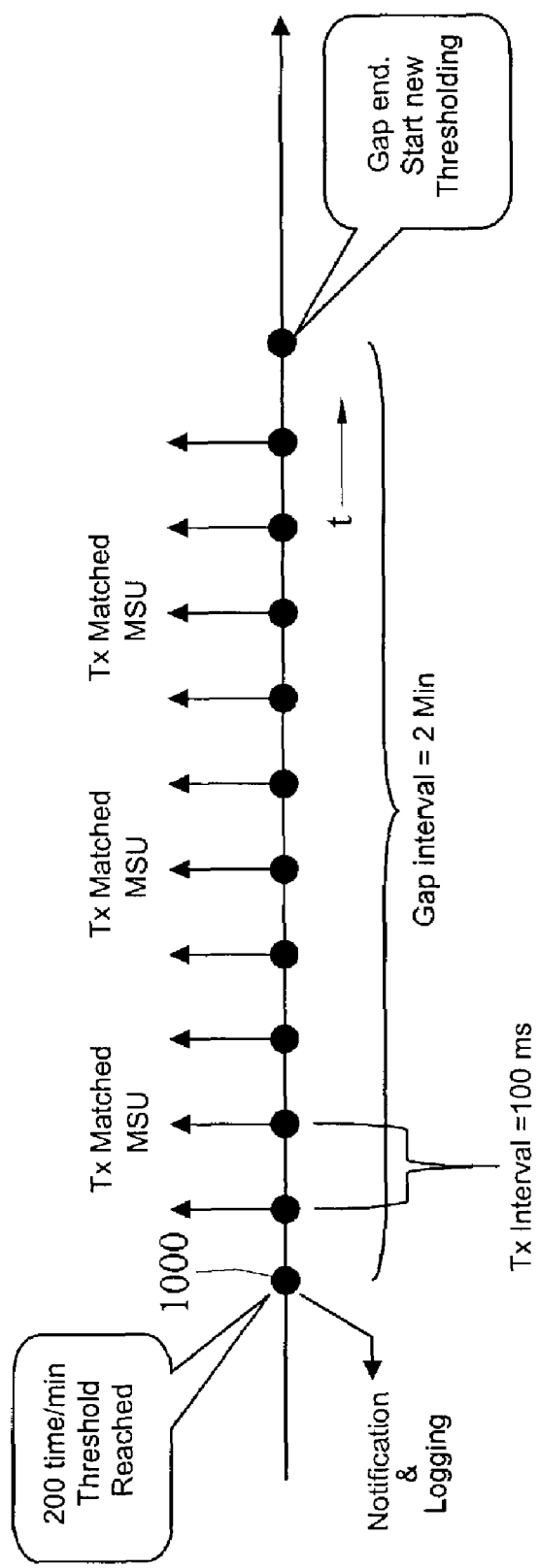
FIG. 10 is a timing diagram illustrating exemplary steps for throttling messages according to an embodiment of the present invention.

FIG. 10 illustrates an example of a throttling action that may be applied to SS7 management messages and other types of attack messages according to an embodiment of the present invention. In FIG. 10, throttling of messages that match a security trigger is performed to prevent a resource from being completely disabled. Referring to FIG. 10, the timing diagram assumes that the frequency of messages affecting the status of the same managed resource is counted. Once a first frequency threshold is reached, as indicated by point 1000, notification, logging, and throttling begins. Thereafter, messages that affect the status of the same managed resource are only allowed to pass every 100 milliseconds. Such a throttling policy prevents the resource being protected from being flooded with messages. The thresholding may continue for a predetermined time period. In the example illustrated in FIG. 10, the time period is two minutes. Once the time period ends, a new thresholding interval begins. Thus, using the steps illustrated in FIG. 10, a resource can be prevented from being flooded with messages. The throttling steps illustrated in FIG. 10, may applied to any type of messages including management messages, ISUP messages, or TCAP messages.

In addition to management attacks and flooding attacks, another type of attack that can be performed is an automatic call gapping attack. Automatic call gapping is a procedure where a database can send a message to a service switching point (SSP) to automatically insert gaps between calls to reduce accesses to the database. If an attacker formulates an invalid automatic call gapping message and sends the message to a switch, the resources of the switch can be significantly slowed. Accordingly, security screening functions 136 on application engines 106 may screen for invalid automatic call gapping messages. An example of an invalid call gapping message is an automatic call gapping message with a valid OPC, a DPC equal to a switch in an operator's network, an automatic call gapping opcode with a valid DN, and a gap duration or interval higher than a predetermined value. If duration or the gap interval is greater than a predetermined value, security screening function 136 may identify the message as invalid and discard the message. Alternatively, or in addition, security screening function 136 may identify and discard ACG messages with invalid TCAP transaction identifiers.

Thus, as illustrated above, the present invention includes improved methods and systems for identifying and mitigating telecommunications network security threats. The improved methods and systems may screen for specific attacks based on management messages using a time-based security policy, such as frequency counting or thresholding. The architecture for performing security screening is preferably distributed such that the processing bottleneck that results from the security screening is minimized. In addition, distributing the security triggers among multiple processors and sending a security decode key along with a message at each level of processing further reduces the processing bottleneck introduced by security screening.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for identifying and mitigating security threats caused by telecommunications management messages, the method comprising:
 (a) receiving telecommunications signaling messages from an external source;
 (b) from the telecommunications signaling messages, screening telecommunications management messages affecting the status of the same managed resource;
 (c) applying a time-based security policy to the management messages affecting the status of the same managed resource;
 (d) determining whether the time-based security policy is violated; and
 (e) in response to determining that the time-based security policy is violated, performing a mitigating action to protect the resource.

2. The method of claim 1 wherein screening management messages affecting the status of the same managed resource includes identifying SS7 MTP3 network management messages affecting the status of the same signaling link.

3. The method of claim 1 wherein screening management messages affecting the status of the same managed resource includes identifying SS7 MTP3 network management messages affecting the status of the same signaling link group.

4. The method of claim 1 wherein screening management messages affecting the status of the same managed resource includes identifying SS7 MTP3 network management messages affecting the status of the same IP signaling link.

5. The method of claim 1 wherein screening management messages affecting the status of the same managed resource includes identifying SS7 MTP3 network management messages affecting the status of the same IP signaling link group.

6. The method of claim 1 wherein screening signaling messages affecting the status of the same managed resource includes identifying telecommunications management messages affecting the status of the same remote network node.

7. The method of claim 1 wherein screening signaling messages affecting the status of the same managed resource includes identifying telecommunications management messages affecting the status of the same group of remote network nodes.

8. The method of claim 1 wherein screening signaling messages affecting the status of the same managed resource includes identifying telecommunications management messages affecting the status of the same route to a remote network node.

9. The method of claim 1 wherein screening signaling messages affecting the status of the same managed resource includes identifying telecommunications management messages affecting the status of the same route to a group of remote network nodes.

10. The method of claim 1 wherein screening signaling messages affecting the status of the same managed resource includes identifying telecommunications management messages affecting the status of the same application subsystem.

11. The method of claim 1 wherein screening signaling messages affecting the status of the same managed resource includes identifying telecommunications management messages affecting the status of the same group of application subsystems.

12. The method of claim 1 wherein screening signaling messages affecting the status of the same managed resource includes identifying telecommunications management messages affecting the status of the same circuit-switched trunk group carrying user data.

13. The method of claim 1 wherein screening signaling messages affecting the status of the same managed resource includes identifying telecommunications management messages affecting the status of the same packet-switched trunk group carrying user data.

14. The method of claim 1 wherein screening signaling messages affecting the status of the same managed resource includes identifying telecommunications management messages affecting the status of the same network-attached customer premises equipment.

15. The method of claim 1 wherein screening telecommunications messages affecting the status of the same managed resource includes identifying session initiation protocol (SIP) management messages affecting the status of the same managed resource.

16. The method of claim 1 wherein screening telecommunications management messages affecting the status of the same managed resource includes screening H.323 messages affecting the status of the same managed resource.

17. The method of claim 1 wherein identifying network management messages affecting the status of the same managed resource includes identifying at least one of: transfer prohibited (TFP), transfer restricted (TFR), transfer controlled (TFC), transfer cluster prohibited (TCP), and transfer cluster restricted (TCR) messages affecting the status of the same managed resource.

18. The method of claim 1 wherein screening messages affecting the status of the same managed resource includes identifying signaling connection control part (SCCP) subsystem management messages (SCMG) affecting the status of the same application subsystem.

19. The method of claim 1 wherein screening messages affecting the status of the same managed resource includes identifying ISDN user part (ISUP) circuit management messages affecting the same circuit or voice trunk.

20. The method of claim 19 wherein identifying circuit management messages affecting the same circuit or trunk includes identifying at least one of: block (BLK), circuit group block (CGB), reset CIC (RSC), circuit group reset (CGR), and unavailable CIC (UCIC) messages relating to the same voice trunk or circuit group.

21. The method of claim 1 wherein screening messages affecting the status of the same managed resource includes screening automatic call gap messages relating to the same application.

22. The method of claim 1 wherein applying a time-based security screening policy to the management messages affecting the status of the same managed resource includes counting the frequency of the management messages.

23. The method of claim 1 wherein applying a time-based security policy to the management messages affecting the status of the same managed resource includes determining whether oscillation in status of the managed resource is present.

24. The method of claim 1 wherein performing a mitigating action to protect the resource includes at least one of: dropping the messages, notifying an operator, and logging the messages.

25. The method of claim 1 wherein performing a mitigating action to protect the managed resource includes throttling the messages.

26. The method of claim 25 where throttling the messages includes:

(a) determining when the frequency of the messages affecting the status of the same managed resource exceeds a threshold;
(b) in response to determining that the frequency of the messages exceeds the threshold, passing the messages only at fixed intervals for a set time period; and
(c) upon expiration of the set time period, passing messages upon receipt, and repeating steps (a) and (b).

27. The method of claim 1 wherein performing a mitigating action to protect the resource includes requesting pre-confirmation form a network operator before passing future messages affecting the status of the same managed resource.

28. A system for identifying and mitigating telecommunications network security threats caused by management messages, the system comprising:

(a) a plurality of communications modules for sending and receiving signaling messages over external signaling links, each communications module including a security screening function for identifying predetermined management messages for further security screening; and
(b) a plurality of database service modules for receiving the messages identified by the communications modules as requiring further screening, each database service module including a second security screening function for identifying messages received from the communications modules that relate to the same managed entity, for applying a time-based security policy to the messages, and for performing a mitigating action in response to determining that the messages violate the time-based security policy.

29. The system of claim 28 wherein the first security screening functions associated with the communications modules are adapted to identify predetermined MTP3 network management messages as candidates for further security screening.

30. The system of claim 28 wherein the first security screening functions are adapted to identify predetermined signaling connection control part subsystem management messages as candidates for further security screening.

31. The system of claim 28 wherein the first security screening functions are adapted to identify predetermined circuit management messages as candidates for further security screening.

32. The system of claim 28 wherein the second security screening functions are adapted to count the frequency of the messages identified by the first security screening function as candidates for further screening, and, in response to the frequency exceeding a predetermined value, for performing the mitigating action.

33. The system of claim 28 wherein the second security screening functions are adapted to determine whether oscillation in status of the managed resource is present based on the management messages identified by the first security screening function as candidates for further security screening, and, in response to detecting oscillation in status of the managed resource, for performing the mitigating action.

34. The system of claim 28 wherein the second security screening functions are adapted to throttle the messages identified as candidates for further screening by the first security screening function in response to determining that the time-based security policy has been violated.

35. The system of claim 28 wherein the second security screening functions are adapted to drop messages identified as candidates for further security screening in response to determining that the time-based security policy has been violated.

36. The system of claim 28 wherein the second security screening functions are adapted to notify an operator in response to determining that the time-based security policy has been violated.

37. A computer program product comprising computer executable instructions embodied in a computer-readable medium for performing steps comprising:
  (a) receiving telecommunications signaling messages;
  (b) from the telecommunications signaling messages, screening telecommunications management messages affecting the status of the same managed resource;
  (c) applying a time-based security policy to the management messages that relate to the same managed resource;
  (d) determining whether the time-based security policy is violated; and
  (e) in response to determining that the time-based security policy is violated, performing a mitigating action to protect the managed resource.

38. The computer program product of claim 37 wherein screening management messages affecting the status of the same managed resource includes identifying SS7 MTP3 network management messages affecting the status of the same signaling link.

39. The computer program product of claim 37 wherein identifying network management messages affecting the status of the same managed resource includes identifying at least one of: transfer prohibited (TFP), transfer restricted (TFR), transfer controlled (TFC), transfer cluster prohibited (TCP), and transfer cluster restricted (TCR) messages affecting the status of the same managed resource.

40. The computer program product of claim 37 wherein screening messages affecting the status of the same managed resource includes identifying signaling connection control part (SCCP) subsystem management messages (SCMG) affecting the status of the same application subsystem.

41. The computer program product of claim 37 wherein screening messages affecting the status of the same managed resource includes identifying ISDN user part (ISUP) circuit management messages affecting the same circuit or voice trunk.

42. The computer program product of claim 41 wherein identifying circuit management messages affecting the same circuit or trunk includes identifying at least one of: block (BLK), circuit group block (CGB), reset CIC (RSC), circuit group reset (CGR), and unavailable CIC (UCIC) messages relating to the same voice trunk or circuit group.

43. The computer program product of claim 37 wherein screening messages affecting the status of the same managed resource includes screening automatic call gap messages relating to the same application.

44. The computer program product of claim 37 wherein applying a time-based security screening policy to the management messages affecting the status of the same managed resource includes counting the frequency of the management messages.

45. The computer program product of claim 37 wherein applying a time-based security policy to the management messages affecting the status of the same managed resource includes determining whether oscillation in status of the managed resource is present.

46. The computer program product of claim 37 wherein performing a mitigating action to protect the resource includes at least one of: dropping the messages, notifying an operator, and logging the messages.

47. The computer program product of claim 37 wherein performing a mitigating action to protect the managed resource includes throttling the messages.

48. The computer program product of claim 47 where throttling the messages includes:
  (a) determining when the frequency of the messages affecting the status of the same managed resource exceeds a threshold;
  (b) in response to determining that the frequency of the messages exceeds the threshold, passing the messages only at fixed intervals for a set time period; and
  (c) upon expiration of the set time period, passing messages upon receipt, and repeating steps (a) and (b).

49. The computer program product of claim 37 wherein performing a mitigating action to protect the resource includes requesting pre-confirmation from a network operator before passing future messages affecting the status of the same managed resource.

50. A computer program product comprising computer executable instructions embodied in a computer-readable medium for performing steps comprising:
  (a) receiving telecommunications signaling messages;
  (b) identifying, from the signaling messages, messages that match a security screening policy;
  (c) determining when the frequency of the messages that match the security screening policy reaches a predetermined threshold;
  (d) in response to determining that the frequency reaches the predetermined threshold, throttling the messages for a set time period; and
  (e) at the end of the set time period, passing the matching messages upon receipt and repeating steps (a)-(d).

51. The computer program product of claim 50 wherein identifying messages that match a security screening policy includes identifying ISDN user part (ISUP) messages that match an ISUP security screening policy.

52. The computer program product of claim 50 wherein identifying messages that match a security screening policy includes identifying transaction capabilities application part (TCAP) messages that match an TCAP security screening policy.

53. The computer program product of claim 50 wherein identifying messages that match a security screening policy includes identifying management messages that match a management message security screening policy.

54. The computer program product of claim 53 wherein identifying management messages that match a management message security screening policy includes identifying SS7 MTP3 network management messages relating to the same managed resource.

55. The computer program product of claim 53 wherein identifying management messages that match a management message security screening policy includes identifying SCCP subsystem management messages relating to the same managed resource.

56. The computer program product of claim 53 wherein identifying management messages that match a management message security screening policy includes identifying circuit management messages relating to the same managed resource.

* * * * *